Figure 1:
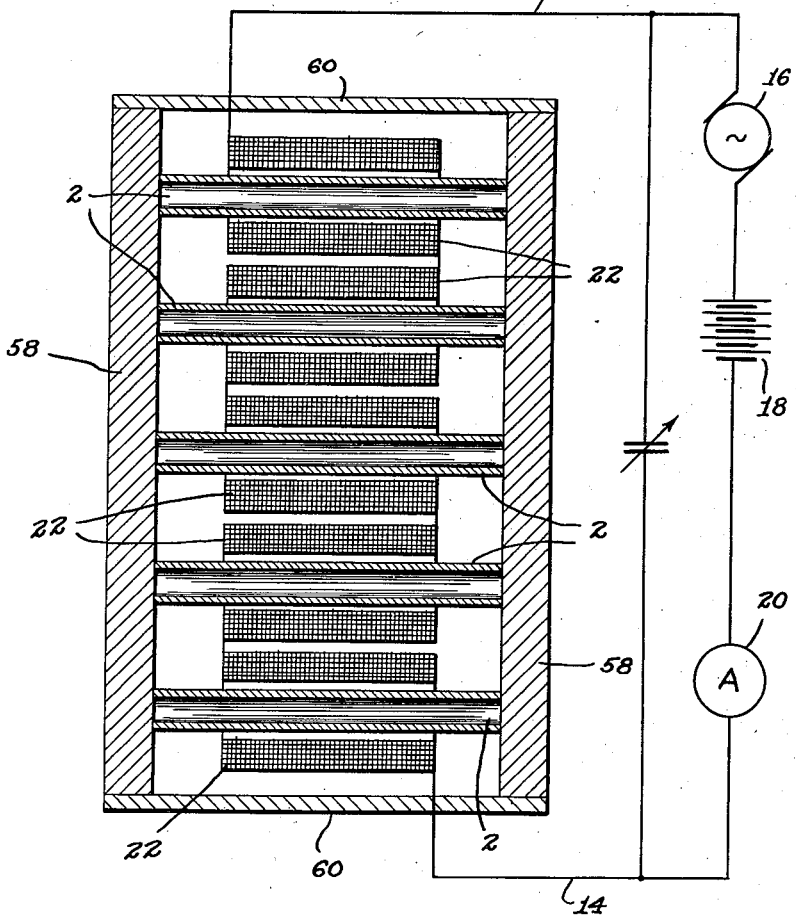

Sept. 17, 1935.  G. W. PIERCE  2,014,410
ELECTROMAGNETOSTRICTIVE VIBRATOR
Original Filed Jan. 3, 1927  2 Sheets-Sheet 1

Inventor
George W. Pierce
by Dans Rines
Attorney

Sept. 17, 1935. G. W. PIERCE 2,014,410
ELECTROMAGNETOSTRICTIVE VIBRATOR
Original Filed Jan. 3, 1927  2 Sheets-Sheet 2
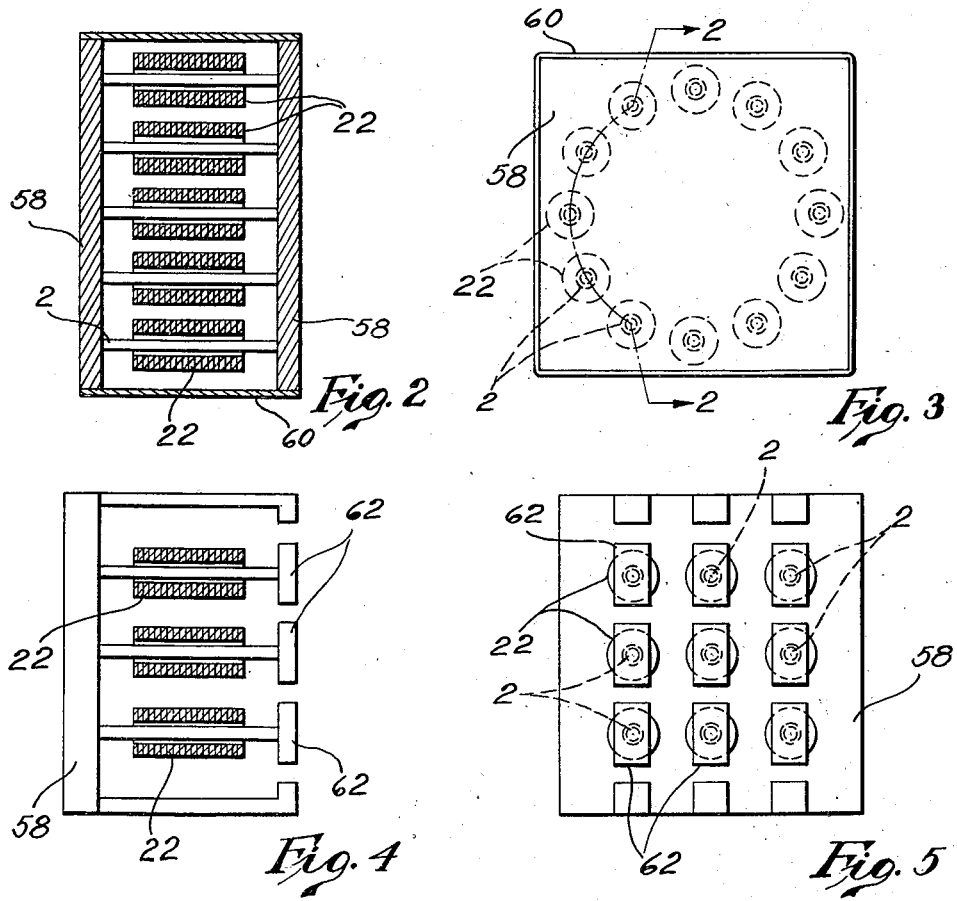

Patented Sept. 17, 1935

2,014,410

UNITED STATES PATENT OFFICE 2,014,410

ELECTROMAGNETOSTRICTIVE VIBRATOR

George W. Pierce, Cambridge, Mass.

Original application January 3, 1927, Serial No. 158,452, now Patent No. 1,750,124, dated March 11, 1930. Divided and this application July 20, 1928, Serial No. 294,283. In Canada December 31, 1927

21 Claims. (Cl. 177—386)

The present invention relates to the transmission and reception of intelligence, using sound as the agency of communication, and more particularly to communication by sound through water or other dense media.

A feature of the invention is the use of tuned magnetostrictive vibrators. Magnetostrictive vibrators, as is explained in a copending application, Serial No. 158,452, filed January 3, 1927, and which matured, on March 11, 1930 into Letters Patent No. 1,750,124, of which the present application is a division, are constituted of a magnetostrictive core disposed in an electromagnetic field, such as may be produced by a coil or winding in an electric circuit. When stimulated magnetically by the field, the core becomes slightly mechanically deformed or distorted by magnetostriction. The resulting increment of deformation may be a lengthening, or a shortening, or some other distortion, depending on the material and on the polarity of the increment of the magnetic field. Conversely, when the vibrator is mechanically deformed or distorted, it will react or respond magnetically by magnetostriction with an increment of magnetization depending upon the nature of the preexisting magnetic field and the mechanical deformation. The mechanical deformation is produced by exciting reversible internal stresses in the core and the core readily recovers upon the withdrawal of the deforming forces.

The invention will be explained in greater detail in connection with the accompanying drawings, in which Fig. 1 is a diagrammatic view, partly in section, of apparatus and circuits constructed and arranged to illustrate a principle of the present invention, and showing a vibrator modified with respect to the vibrator shown in Fig. 2; Fig. 2 is a section similar to Fig. 1 of a vibrator particularly designed for producing sound in water, the section being taken upon the line 2—2 of Fig. 3, looking in the direction of the arrows; Fig. 3 is an elevation of the same: and Figs. 4 and 5 are views similar to Figs. 2 and 3, respectively, of a further modification.

A plurality of cores 2 are shown, each axially positioned in, and driven by, an inductive and resistive field solenoid coil 22, magnetostrictively cooperative with its corresponding core 2. The cores 2 may be held in place so as each to vibrate freely longitudinally about a nodal point at or near its center. The cores 2 may be in the form of tubes, as illustrated in Fig. 1, or rods, as shown in Figs. 2 to 5, or they may be otherwise constructed, as explained in the said Letters Patent. As is also described in the said Letters Patent, they are preferably of nickel, nickel-steel, nickel-copper, nickel-cobalt, chrome-nickel, chrome steel, or of any other metal element or alloy characterized by comparatively large magnetostrictive effects and comparatively low vibrational decrement. By proper choice of length and other dimensions, the apparatus may be made applicable to systems of high or low frequency within a range that may extend from a hundred cycles to hundreds of thousands of cycles.

Conductors 12 and 14 connect the cores 2, for simplicity, in series with a source of alternating electromotive force, such as an alternating current generator 16, for passing an actuating periodic current through the coils 22. Other, more complicated, sources of alternating current are illustrated in other figures of the above-entitled Letters Patent. A local battery 18, in series with the source 16 and the windings 22, applies a steady magnetizing field to the cores 2, over which the alternating field produced by the generator 16 is superposed, so as to polarize the cores 2. The alternating field is preferably smaller than the steady field, in order that the combined fields may not, at any time, fall to zero. The battery may be dispensed with, and the cores may be magnetized electromagnetically by a local source, or it may be permanently magnetized, instead, or the battery and a permanently magnetized core may be employed together.

If the current or voltage in the coils 22 is alternating, the electromagnetic field created thereby will also be alternating. The cores 2 will, therefore, increase and decrease in length (let us say) many times a second, every variation in the current producing its stimulative effect on the cores 2, and every deformation of the cores producing their reaction response upon the current. The cores 2 will, in consequence, vibrate mechanically by magnetostriction, contracting and expanding lengthwise to and from nodal points in an intermediately disposed, nodal plane, in which nodal plane the cores execute no appreciable movement. As the cores 2 are spaced from each other, they are free to expand and contract sidewise at their nodal planes, in a direction perpendicular to the before-mentioned, lengthwise vibration of the cores 2.

The cores thus vibrate freely, with a period of vibration equal to the period of the alternating electromotive force. Ordinarily, these vibrations will be quite small. When the alternating frequency is close to, or substantially the same as, the natural frequency of mechanical vibration of the system, however, the amplitude of vibration of the cores, though still small, becomes relatively quite large. The cores 2 will then react magnetostrictively on the coils to render their consumption of power critical as to frequency for frequencies near the free frequency of the cores. By proper choice of length and other dimensions, as before stated, the cores 2 may be proportioned effectively to transmit vibrational stresses lengthwise of the cores 2 to and from the hereinafter described diaphragm means. Of course, there will usually be more than one specific frequency of magnetization at which the system will thus resonate; for in addition to one or more natural fundamental frequencies of mechanical vibration of the system of the cores and diaphragms, the system may also resonate to frequencies of vibration determined by the operation of the cores with multiple nodal points, as is explained more at length in the said Letters Patent, and it will be sufficient here to remember that the operation described herein is equally applicable to the fundamentals and their overtones.

According to the present invention, a novel, mechanical vibratory system is provided, comprising the magnetostrictive cores 2 and diaphragm means, for use, as a sonic oscillator, in the production and reception of sounds of any desired frequency, particularly high frequencies, for sonorously communicating through water or other dense media in which the diaphragm means is positioned. The cores 2, of highly magnetostrictive material, are shown attached to one or more diaphragms 58, Figs. 1 to 5, at separated, spaced positions. Owing to the above-described, lengthwise expansion and contraction of the cores 2 to and from the said intermediately disposed, nodal plane, corresponding ends of the cores, with the diaphragm 58 affixed thereto, will tend to move back and forth as a unit, piston-wise. The diaphragm means has a restricted area, as shown, to which its sonorous vibration is confined, thereby facilitating the said piston-wise cophasing of the parts of the diaphragm means. This piston-wise cophasing of the parts of the diaphragm means 58 is further facilitated by the vibrational constants of the cores 2 cooperating with the forces exerted upon and by the diaphragm means at the respective points of attachment of the cores 2 to the diaphragm means 58. As each core 2 is of relatively small, cross-sectional area, the total aggregate of cross-sectional areas of the metal of the magnetostrictive cores 2 is but a small fraction of the whole extent of the restricted area of the diaphragm means, as illustrated, owing to the spaced points at which the cores are affixed to the diaphragm means. The coils 22 may be connected together, either in parallel or in series, as desired, and through which are passed an actuating periodic current superposed over a magnetizing direct current, as before described. The fields of adjacent coils are preferably reversed so that the lines of force go to the right through one set of cores 2 and to the left through the alternately placed set of cores 2. The magnetizing current may be passed through auxiliary coils, if desired. The cores are preferably free from contact with the coils, so as to reduce friction, which would prevent free vibration. The mechanical system is tuned to the desired frequency, in the medium in which it is to be used, thus enormously increasing, with the electrical tuning, the current or voltage of the transmitter or the receiver. The diaphragm means and its cores 2 may be so designed as to elasticity, length and other dimensions, and associated mass, as to have, as a unit, a natural period of mechanical vibration resonant to the frequency of the periodic current in the coils 22. The chamber in which the coils are contained is sealed against the entry of water when submerged, as by means of a yielding, cylindrical band 60.

In the modification of Figs. 4 and 5, one of the diaphragms is constituted of the free ends of the cores 2, each having a small cap-plate 62.

The magnetostrictive vibrators are thus constituted of a plurality of magnetostrictive bodies separately dimensioned for resonantly cooperating with the diaphragm means, in their expansion and contraction, to interchange electromagnetic energy and sound energy with the sound-conveying medium. By their magnetostrictive expansion and contraction, under the action of currents in the coils 22, the cores 2 will cooperate with the coils 22 to vibrate the diaphragm means to produce radiation of sound into the medium. By their expansion and contraction in response to the incidence of sound in the medium upon the diaphragm means, the cores 2 will cooperate with the coils 22 to generate electric voltages in the coils 22. A multiple unit of this character will produce greater power than a single unit of corresponding area, and is freer from eddy-current and hysteresis losses, besides being more flexible, so as more easily to conform elastically to the nature of the medium in which it is operating. The number of magnetostrictive elements, their distribution, and their lengths are of magnitudes suitable to easy adjustment for a predetermined resonant system designed to operate at any given frequency, within a wide range, as, for example, 10,000 or 40,000 cycles per second. The distribution of driving members permits the ready radiation and distribution of heat, and lends itself to the use of large amounts of power. With thirty seven magnetostrictive driving elements, more than a kilowatt of power can be supplied to the system at 30,000 cycles per second; and, by a larger number of elements, proportionally larger power may be used. The multiple-driven diaphragm is elastically supported at properly spaced distributed areas, capable of sharp and effective tuning, with a large radiating face, and the system has low, mechanical, internal-power losses, capable of high rigidity, or of a rigidity adaptable to the medium in which it is used, by the choice of areas and distribution of driving elements. The system is also characterized by great durability, constancy, and high efficiency. The magnetostrictive drive produces an elasticity and rigidity determined in large part by the driving rods or tubes themselves, but the diaphragm means and the cores 2 have elastic and mass constants and dimensions of values to cause the diaphragm means and the cores both to contribute substantially to the vibration of the mechanical system constituted of the diaphragm means and the cores 2. A distribution of these members over the face of the diaphragm supplies rigidity to it at a multitude of points and insures a more uniform elasticity for the whole radiating diaphragm. The system finds particular value at superaudible frequencies, the period of the vibration of the restricted area of the diaphragm means, and the consequent sound wavelength transmitted or received, being small enough relative to the restricted area of the diaphragm means, so that the system shall be directively discriminating as to the sound, thus rendering the diaphragm means directive.

Other modifications will be obvious to persons skilled in the art, and all such are considered to fall within the spirit and scope of the present invention, as defined in the appended claims.

What is claimed is:—

1. Apparatus for magnetostrictively interchanging electromagnetic energy and sound energy having in combination, a mechanical vibratory system comprising diaphragm means and a plurality of cores of highly magnetostrictive material affixed to the diaphragm means at separated, spaced positions, the diaphragm means being adapted to be positioned in relation to a sound-conveying medium for sonorously intercommunicating energy with the medium by means of its sonorous vibration, the diaphragm means having a restricted area to which its sonorous vibration is confined, and coil means magnetostrictively cooperative with the cores, the aggregate cross-sectional area of the metal of the cores being small relative to the said area of the diaphragm means, but the cores being proportioned effectively to transmit vibrational stresses lengthwise of the cores to and from the diaphragm means in order to enable the cores to cooperate with the coil means, by their magnetostrictive expansion and contraction under the action of currents in the coil means, to vibrate the diaphragm means to produce radiation of sound into the medium, and to cooperate with the coil means, by their expansion and contraction in response to the incidence of sound in the medium upon the diaphragm means, to generate electric voltages magnetostrictively in the said coil means.

2. A sound transmitter having, in combination, a mechanical vibratory system comprising diaphragm means and a plurality of cores of highly magnetostrictive material affixed to the diaphragm means at separated, spaced positions, the diaphragm means being adapted to be positioned in relation to a sound-conveying medium to produce radiation of sound into the medium by means of its sonorous vibration, the diaphragm means having a restricted area to which its sonorous vibration is confined, and coil means magnetostrictively cooperative with the cores, the aggregate cross-sectional area of the metal of the cores being small relative to the said area of the diaphragm means, but the cores being proportioned effectively to transmit vibrational stresses lengthwise of the cores to and from the diaphragm means in order to enable the cores to cooperate with the coil means, by their magnetostrictive expansion and contraction under the action of currents in the coil means, to vibrate the diaphragm means to produce radiation of sound into the medium.

3. A sound receiver having, in combination, a mechanical vibratory system comprising diaphragm means and a plurality of cores of highly magnetostrictive material affixed to the diaphragm means at separated, spaced positions, the diaphragm means being adapted to be positioned in relation to a sound-conveying medium for receiving sound from the medium, the diaphragm means having a restricted area to which its sonorous vibration is confined, and coil means magnetostrictively cooperative with the cores, the aggregate cross-sectional area of the metal of the cores being small relative to the said area of the diaphragm means, but the cores being proportioned effectively to transmit vibrational stresses lengthwise of the cores to and from the diaphragm means in order to enable the cores to cooperate with the coil means, by their expansion and contraction in response to the incidence of sound in the medium upon the diaphragm means, to generate electric voltages magnetostrictively in the said coil means.

4. Apparatus for magnetostrictively interchanging electromagnetic energy and sound energy having, in combination, a mechanical vibratory system comprising diaphragm means and a plurality of cores of highly magnetostrictive material affixed to the diaphragm means at separated, spaced positions, the diaphragm means being adapted to be positioned in relation to a sound-conveying medium for sonorously intercommunicating energy with the medium by means of its sonorous vibration, the diaphragm means having a restricted area to which its sonorous vibration is confined, the diaphragm means and the cores having elastic and mass constants and dimensions of values to cause the diaphragm means and the cores both to contribute substantially to the vibration of the mechanical system, and coil means magnetostrictively cooperative with the cores, the aggregate cross-sectional area of the metal of the cores being small relative to the said area of the diaphragm means, but the cores being proportioned effectively to transmit vibrational stresses lengthwise of the cores to and from the diaphragm means in order to enable the cores to cooperate with the coil means, by their magnetostrictive expansion and contraction under the action of currents in the coil means, to vibrate the diaphragm means to produce radiation of sound into the medium, or to cooperate with the coil means, by their expansion and contraction in response to the incidence of sound in the medium upon the diaphragm means, to generate electric voltages magnetostrictively in the said coil means.

5. Apparatus for magnetostrictively interchanging electromagnetic energy and sound energy having in combination, a mechanical vibratory system having a natural period of vibration and comprising diaphragm means and a plurality of cores of highly magnetostrictive material affixed to the diaphragm means at separated, spaced positions, the diaphragm means being adapted to be positioned in relation to a sound-conveying medium and sonorously intercommunicating energy with the medium by means of its sonorous vibration, the diaphragm means having a restricted area to which its sonorous vibration is confined, the diaphragm means and the cores having elastic and mass constants and dimensions of values to cause the diaphragm means and the cores both to contribute substantially to the said natural period of vibration of the mechanical system, and coil means magnetostrictively cooperative with the cores, the aggregate cross-sectional area of the metal of the cores being small relative to the said area of the diaphragm means, but the cores being proportioned effectively to transmit vibrational stresses lengthwise of the cores to and from the diaphragm means in order to enable the cores to cooperate with the coil means, by their magnetostrictive expansion and contraction under the action of currents in the coil means, to vibrate the diaphragm means to produce radiation of sound into the medium, or to cooperate with the coil means, by their expansion and contraction in response to the incidence of sound in the medium upon the diaphragm means, to generate electric voltages magnetostrictively in the said coil means.

6. Apparatus for magnetostrictively interchanging electromagnetic energy and sound energy having, in combination, a mechanical vibratory system having a natural period of vibration and comprising diaphragm means and a plurality of cores of highly magnetostrictive material affixed to the diaphragm means at separated, spaced positions, the diaphragm means being adapted to be positioned in relation to a sound-conveying medium for sonorously intercommunicating energy with the medium by means of its sonorous vibration, the diaphragm means having a restricted area to which its sonorous vibration is confined, the diaphragm means and the cores having elastic and mass constants and dimensions of values to cause the diaphragm means and the cores both to contribute substantially to the said natural period of vibration of the mechanical system, the vibrational constants of the cores cooperating with the diaphragm-means forces at the respective points of attachment of the cores to the diaphragm means in order to facilitate the cophasing of the parts of the diaphragm means, and coil means magnetostrictively cooperative with the cores, the aggregate cross-sectional area of the metal of the cores being small relative to the said area of the diaphragm means, but the cores being proportioned effectively to transmit vibrational stresses lengthwise of the cores to and from the diaphragm means in order to enable the cores to cooperate with the coil means, by their magnetostrictive expansion and contraction under the action of currents in the coil means, to vibrate the diaphragm means to produce radiation of sound into the medium, or to cooperate with the coil means, by their expansion and contraction in response to the incidence of sound in the medium upon the diaphragm means, to generate electric voltages magnetostrictively in the said coil means.

7. Apparatus for magnetostrictively interchanging electromagnetic energy and sound energy having, in combination, a mechanical vibratory system having a natural period of vibration and comprising diaphragm means and a plurality of cores of highly magnetostrictive material affixed to the diaphragm means at separated, spaced positions, the diaphragm means being adapted to be positioned in relation to a sound-conveying medium for sonorously intercommunicating energy with the medium by means of its sonorous vibration, the diaphragm means having a restricted area to which its sonorous vibration is confined, the diaphragm means and the cores having elastic and mass constants and dimensions of values to cause the diaphragm means and the cores both to contribute substantially to the said natural period of vibration of the mechanical system, the vibrational constants of the cores cooperating with the diaphragm-means forces at the respective points of attachment of the cores to the diaphragm means in order to facilitate piston-wise cophasing of the parts of the diaphragm means, and coil means magnetostrictively cooperative with the cores, the aggregate cross-sectional area of the metal of the cores being small relative to the said area of the diaphragm means, but the cores being proportioned effectively to transmit vibrational stresses lengthwise of the cores to and from the diaphragm means in order to enable the cores to cooperate with the coil means, by their magnetostrictive expansion and contraction under the action of currents in the coil means, to vibrate the diaphragm means piston-wise to produce radiation of sound into the medium, or to cooperate with the coil means, by their expansion and contraction in response to the incidence of sound in the medium upon the diaphragm means to drive the diaphragm means piston-wise, to generate electric voltages magnetostrictively in the said coil means.

8. Apparatus for magnetostrictively interchanging electromagnetic energy and sound energy having, in combination, a mechanical vibratory system comprising diaphragm means and a plurality of cores of highly magnetostrictive material affixed to the diaphragm means at separated, spaced positions, the diaphragm means being adapted to be positioned in relation to a sound-conveying medium for sonorously intercommunicating energy with the medium by means of its sonorous vibration, the diaphragm means having a restricted area to which its sonorous vibration is confined, the diaphragm means and the cores having elastic and mass constants and dimensions of values to cause the diaphragm means and the cores both to contribute substantially to the vibration of the mechanical system, the cores having substantial equality as to vibration constants, and coil means magnetostrictively cooperative with the cores, the aggregate cross-sectional area of the metal of the cores being small relative to the said area of the diaphragm means, but the cores being proportioned effectively to transmit vibrational stresses lengthwise of the cores to and from the diaphragm means in order to enable the cores to cooperate with the coil means, by their magnetostrictive expansion and contraction under the action of currents in the coil means, to vibrate the diaphragm means to produce radiation of sound into the medium, or to cooperate with the coil means, by their expansion and contraction in response to the incidence of sound in the medium upon the diaphragm means, to generate electric voltages magnetostrictively in the said coil means.

9. Apparatus for magnetostrictively interchanging electromagnetic energy and sound energy having, in combination, a mechanical vibratory system comprising diaphragm means and a plurality of cores of highly magnetostrictive material affixed to the diaphragm means at separated, spaced positions, the diaphragm means being adapted to be positioned in relation to a sound-conveying medium for sonorously intercommunicating energy with the medium by means of its sonorous vibration, the diaphragm means having a restricted area to which its sonorous vibration is confined, the diaphragm means and the cores having elastic and mass constants and dimensions of values to cause the diaphragm means and the cores both to contribute substantially to the vibration of the mechanical system, the cores having substantial equality as to vibration constants and having a comparatively low vibrational decrement to facilitate their vibrations, and coil means magnetostrictively cooperative with the cores, the aggregate cross-sectional area of the metal of the cores being small relative to the said area of the diaphragm means, but the cores being proportioned effectively to transmit vibrational stresses lengthwise of the cores to and from the diaphragm means in order to enable the cores to cooperate with the coil means, by their magnetostrictive expansion and contraction under the action of currents in the coil means, to vibrate the diaphragm means to produce radiation of sound into the medium, or to cooperate with the coil means, by their expansion and contraction in response to the incidence of sound in the medium upon the diaphragm means, to generate electric voltages magnetostrictively in the said coil means.

10. Apparatus for magnetostrictively interchanging electromagnetic energy and sound energy having, in combination, a mechanical vibratory system comprising diaphragm means and a plurality of rigid tubular cores of highly magnetostrictive material affixed to the diaphragm means at separated, spaced positions, the diaphragm means being adapted to be positioned in relation to a sound-conveying medium for sonorously intercommunicating energy with the medium by means of its sonorous vibration, the diaphragm means having a restricted area to which its sonorous vibration is confined, and a coil for, and magnetostrictively cooperative with, each tubular core, the aggregate cross-sectional area of the metal of the cores being small relative to the said area of the diaphragm means, but the cores being proportioned effectively to transmit vibrational stresses lengthwise of the cores to and from the diaphragm means in order to enable the cores to cooperate with their respective coils, by their magnetostrictive expansion and contraction under the action of currents in the respective coils, to vibrate the diaphragm means to produce radiation of sound into the medium, or to cooperate with the respective coils, by their expansion and contraction in response to the incidence of sound in the medium upon the diaphragm means, to generate electric voltages magnetostrictively in the respective coils.

11. Apparatus for magnetostrictively interchanging electromagnetic energy and sound energy having, in combination, a mechanical vibratory system comprising diaphragm means and a plurality of cores of highly magnetostrictive material affixed to the diaphragm means at separated, spaced positions, the diaphragm means being adapted to be positioned in a body of water for sonorously intercommunicating energy with the water by means of its sonorous vibration, the diaphragm means having a restricted area to which its sonorous vibration is confined, the diaphragm means and the cores having elastic and mass constants and dimensions of values to cause the diaphragm means and the cores both to contribute substantially to the vibration of the mechanical system, and coil means magnetostrictively cooperative with the cores, the aggregate cross sectional area of the metal of the cores being small relative to the said area of the diaphragm means, but the cores being proportioned effectively to transmit vibrational stresses lengthwise of the cores to and from the diaphragm means in order to enable the cores to cooperate with the coil means, by their magnetostrictive expansion and contraction under the action of currents in the coil means, to vibrate the diaphragm means to produce radiation of sound into the water, or to cooperate with the coil means, by their expansion and contraction in response to the incidence of sound in the water upon the diaphragm means, to generate electric voltages magnetostrictively in the said coil means.

12. Apparatus for magnetostrictively interchanging electromagnetic energy and sound energy having, in combination, a mechanical vibratory system comprising diaphragm means and a plurality of cores of highly magnetostrictive material affixed to the diaphragm means at separated, spaced positions, the diaphragm means being adapted to be positioned in relation to a sound-conveying medium for sonorously intercommunicating energy with the medium by means of its sonorous vibration, the diaphragm means having a restricted area to which its sonorous vibration is confined, and coil means magnetostrictively cooperative with the cores, the aggregate cross-sectional area of the metal of the cores being small relative to the said area of the diaphragm means, but the cores being proportioned effectively to transmit vibrational stresses lengthwise of the cores to and from the diaphragm means in order to enable the cores to cooperate with the coil means, by their magnetostrictive expansion and contraction under the action of currents in the coil means, to vibrate the diaphragm means to produce radiation of sound into the medium, or to cooperate with the coil means, by their expansion and contraction in response to the incidence of sound in the medium upon the diaphragm means, to generate electric voltages magnetostrictively in the said coil means, the cores being separately dimensioned and tuned to cooperate effectively with the frequency of the current in the coil means.

13. Apparatus for magnetostrictively interchanging electromagnetic energy and sound energy having, in combination, a mechanical vibratory system having a natural period of vibration and comprising diaphragm means and a plurality of cores of highly magnetostrictive material affixed to the diaphragm means at separated, spaced positions over substantially the whole extent of the diaphragm means, the diaphragm means being adapted to be positioned in relation to a sound-conveying medium for sonorously intercommunicating energy with the medium by means of its sonorous vibration, the diaphragm means having a restricted area to which its sonorous vibration is confined, the diaphragm means and the cores having elastic and mass constants and dimensions of values to cause the diaphragm means and the cores both to contribute substantially to the said natural period of vibration of the mechanical system, the vibrational constants of the cores cooperating with the diaphragm-means forces at the respective points of attachment of the cores to the diaphragm means in order to facilitate piston-wise cophasing of the parts of the diaphragm means, and coil means magnetostrictively cooperative with the cores, the aggregate cross-sectional area of the metal of the cores being small relative to the said area of the diaphragm means, but the cores being proportioned effectively to transmit vibrational stresses lengthwise of the cores to and from the diaphragm means in order to enable the cores to cooperate with the coil means, by their magnetostrictive expansion and contraction under the action of currents in the coil means, to vibrate the diaphragm means piston-wise to produce radiation of sound in the medium, or to cooperate with the coil means, by their expansion and contraction in response to the incidence of sound in the medium upon the diaphragm means to drive the diaphragm means piston-wise, to generate electric voltages magnetostrictively in the said coil means.

14. Apparatus for magnetostrictively interchanging electromagnetic energy and sound energy having, in combination, a mechanical vibratory system having a natural period of vibration and comprising diaphragm means and a plurality of cores of highly magnetostrictive material affixed to the diaphragm means at separated, spaced positions along a substantially closed, curved path, the diaphragm means being adapted to be positioned in relation to a sound-conveying medium for sonorously intercommunicating energy with the medium by means of its sonorous vibration, the diaphragm means having a restricted area to which its sonorous vibration is confined, the diaphragm means and the cores having elastic and mass constants and dimensions of values to cause the diaphragm means and the cores both to contribute substantially to the said natural period of vibration of the mechanical system, the vibrational constants of the cores cooperating with the diaphragm-means forces at the respective points of attachment of the cores to the diaphragm means in order to facilitate piston-wise cophasing of the parts of the diaphragm means, and coil means magnetostrictively cooperative with the cores, the aggregate cross-sectional area of the metal of the cores being small relative to the said area of the diaphragm means, but the cores being proportioned effectively to transmit vibrational stresses lengthwise of the cores to and from the diaphragm means in order to enable the cores to cooperate with the coil means, by their magnetostrictive expansion and contraction under the action of currents in the coil means, to vibrate the diaphragm means piston-wise to produce radiation of sound into the medium, or to cooperate with the coil means, by their expansion and contraction in response to the incidence of sound in the medium upon the diaphragm means to drive the diaphragm means piston-wise, to generate electric voltages magnetostrictively in the said coil means.

15. Apparatus for magnetostrictively interchanging electromagnetic energy and sound energy having, in combination, a mechanical vibratory system having a natural period of vibration and comprising a diaphragm and a plurality of cores of highly magnetostrictive material affixed to the diaphragm at separated, spaced positions, the diaphragm being adapted to be positioned in relation to a sound-conveying medium for sonorously intercommunicating energy with the medium by means of its sonorous vibration, the diaphragm having a restricted area to which its sonorous vibration is confined, the diaphragm and the cores having elastic and mass constants and dimensions of values to cause the diaphragm and the cores both to contribute substantially to the said natural period of vibration of the mechanical system, the vibrational constants of the cores cooperating with the diaphragm forces at the respective points of attachment of the cores to the diaphragm in order to facilitate piston-wise cophasing of the parts of the diaphragm, and coil means magnetostrictively cooperative with the cores, the aggregate cross-sectional area of the metal of the cores being small relative to the said area of the diaphragm, but the cores being proportioned effectively to transmit vibrational stresses lengthwise of the cores to and from the diaphragm in order to enable the cores to cooperate with the coil means, by their magnetostrictive expansion and contraction under the action of currents in the coil means, to vibrate the diaphragm piston-wise to produce radiation of sound into the medium, or to cooperate with the coil means, by their expansion and contraction in response to the incidence of sound in the medium upon the diaphragm to drive the diaphragm piston-wise, to generate electric voltages magnetostrictively in the said coil means.

16. Apparatus for magnetostrictively interchanging electromagnetic energy and sound energy having, in combination, a mechanical vibratory system comprising a plurality of separated, spaced diaphragms having substantially the same natural frequency and a core of highly magnetostrictive material affixed to each diaphragm, the diaphragms being adapted to be positioned in relation to a sound-conveying medium for sonorously intercommunicating energy with the medium by means of its sonorous vibration, the diaphragms having restrictive areas to which their sonorous vibrations are confined, and coil means magnetostrictively cooperative with the cores, the cross-sectional area of the metal of each core being small relative to the area of its corresponding diaphragm, but the cores having substantial equality as to vibration constants and being proportioned effectively to transmit vibrational stresses lengthwise of the cores to and from the respective diaphragms in order to enable the cores to cooperate with the coil means, by their magnetostrictive expansion and contraction under the action of currents in the coil means, to vibrate the diaphragms to produce radiation of sound into the medium, or to cooperate with the coil means, by their expansion and contraction in response to the incidence of sound in the medium upon the diaphragms, to generate electric voltages magnetostrictively in the said coil means.

17. Apparatus for magnetostrictively interchanging electromagnetic energy and sound energy having, in combination, a mechanical vibratory system having a natural period of vibration and comprising diaphragm means and a plurality of cores of highly magnetostrictive material affixed to the diaphragm means at separated, spaced positions, the diaphragm means being adapted to be positioned in relation to a sound-conveying medium for sonorously intercommunicating energy with the medium by means of its sonorous vibration, the diaphragm means being of area having linear dimensions large compared with the effective wave lengths of the intercommunication and having a restricted area to which its sonorous vibration is confined, the diaphragm means and the cores having elastic and mass constants and dimensions of values to cause the diaphragm means and the cores both to contribute substantially to the said natural period of vibration of the mechanical system, the vibrational constants of the cores cooperating with the diaphragm-means forces at the respective points of attachment of the cores to the diaphragm means, in order to facilitate the cophasing of the parts of the diaphragm means at the said effective wave lengths, and coil means magnetostrictively cooperative with the cores, the aggregate cross-sectional area of the metal of the cores being small relative to the said area of the diaphragm means, but the cores being proportioned effectively to transmit vibrational stresses lengthwise of the cores to and from the diaphragm means in order to enable the cores to cooperate with the coil means, by their magnetostrictive expansion and contraction under the action of currents in the coil means, to vibrate the diaphragm means to produce radiation of sound of the said effective wave lengths into the medium, or to cooperate with the coil means, by their expansion and contraction in response to the incidence of sound of the said effective wave lengths in the medium upon the diaphragm means, to generate electric voltages magnetostrictively in the said coil means.

18. Apparatus for magnetostrictively interchanging electromagnetic energy and sound energy having, in combination, a mechanical vibratory system having a natural period of vibration and comprising diaphragm means and a plurality of cores of highly magnetostrictive material affixed to the diaphragm means at separated, spaced positions, the cores being adapted to contract and expand lengthwise to and from intermediately disposed nodal planes to produce a piston-wise movement of the diaphragm means and being free to expand and contract sidewise at the said nodal planes, the diaphragm means being adapted to be positioned in relation to a sound-conveying medium for sonorously intercommunicating energy with the medium by means of its sonorous vibration, the diaphragm means having a destricted area to which its sonorous vibration is confined, the diaphragm means and the cores having elastic and mass constants and dimensions of values to cause the diaphragm means and the cores both to contribute substantially to the said natural period of vibration of the mechanical system, the vibrational constants of the cores cooperating with the diaphragm-means forces at the respective points of attachment of the cores to the disphragm means, in order to facilitate the pistonwise cophasing of the parts of the diaphragm means, and coil means magnetostrictively cooperative with the cores, the aggregate cross-sectional area of the metal of the cores being small relative to the said area of the diaphragm means, but the cores being proportioned effectively to transmit vibrational stresses lengthwise of the cores to and from the diaphragm means in order to enable the cores to cooperate with the coil means, by their magnetostrictive expansion and contraction under the action of currents in the coil means, to vibrate the diaphragm means piston-wise to produce radiation of sound into the medium, or to cooperate with the coil means, by their expansion and contraction in response to the incidence of sound in the medium upon the diaphragm means to drive the diaphragm means piston-wise, to generate electric voltages magnetostrictively in the said coil means.

19. Apparatus for magnetostrictively interchanging electromagnetic energy and sound energy having, in combination, a mechanical vibratory system having a natural period of vibration and comprising two diaphragm means and a plurality of cores of highly magnetostrictive material affixed at their opposite ends to the two diaphragm means at separated, spaced positions, the cores being adapted to contract and expand lengthwise to and from intermediately disposed nodal planes and being free to expand and contract sidewise at the said nodal planes, the diaphragm means being adapted to be positioned in relation to a sound-conveying medium for sonorously intercommunicating energy with the medium by means of its sonorous vibration, the diaphragm means having restricted areas to which their sonorous vibration is confined, and coil means magnetostrictively cooperative with the cores, the aggregate cross-sectional area of the metal of the cores being small relative to the said area of the diaphragm means, but the cores being proportioned effectively to transmit vibrational stresses lengthwise of the cores to and from the diaphragm means in order to enable the cores to cooperate with the coil means, by their magnetostrictive expansion and contraction under the action of currents in the coil means, to vibrate the diaphragm means to produce radiation of sound into the medium, or to cooperate with the coil means, by their expansion and contraction in response to the incidence of sound in the medium, to generate electric voltages magnetostrictively in the said coil means.

20. Apparatus for magnetostrictively interchanging electromagnetic energy and sound energy having, in combination, a support, a mechanical vibratory system comprising diaphragm means and a plurality of cores of highly magnetostrictive material affixed to the diaphragm means at separated, spaced positions, the diaphragm means being adapted to be positioned in relation to a sound-conveying medium for sonorously intercommunicating energy with the medium by means of its sonorous vibration, the diaphragm means having a restricted area to which its sonorous vibration is confined, and coil means magnetostrictively cooperative with the cores, the aggregate cross-sectional area of the metal of the cores being small relative to the said area of the diaphragm means, but the cores being proportioned effectively to transmit vibrational stresses lengthwise of the cores to and from the diaphragm means in order to enable the cores to cooperate with the coil means, by their magnetostrictive expansion and contraction under the action of currents in the coil means, to vibrate the diaphragm means to produce radiation of sound into the medium, or to cooperate with the coil means, by their expansion and contraction in response to the incidence of sound in the medium upon the diaphragm means, to generate electric voltages magnetostrictively in the said coil means, and means yieldingly connecting the support and the diaphragm means.

21. Apparatus for magnetostrictively interchanging electromagnetic energy and sound energy having, in combination, a support, a mechanical vibratory system comprising diaphragm means and a plurality of cores of highly magnetostrictive material affixed to the diaphragm means at separated, spaced positions, the diaphragm means being adapted to be positioned in relation to a sound-conveying medium for sonorously intercommunicating energy with the medium by means of its sonorous vibration, the diaphragm means having a restricted area to which its sonorous vibration is confined, and coil means magnetostrictively cooperative with the cores, the aggregate cross-sectional area of the metal of the cores being small relative to the said area of the diaphragm means, but the cores being proportioned effectively to transmit vibrational stresses lengthwise of the cores to and from the diaphragm means in order to enable the cores to cooperate with the coil means, by their magnetostrictive expansion and contraction under the action of currents in the coil means, to vibrate the diaphragm means to produce radiation of sound into the medium, or to cooperate with the coil means, by their expansion and contraction in response to the incidence of sound in the medium upon the diaphragm means, to generate electric voltages magnetostrictively in the said coil means, and means yieldingly connecting the diaphragm means with the support, the diaphragm means and the yielding connecting means constituting a housing in which the cores are disposed.

GEORGE W. PIERCE.